(No Model.)  2 Sheets—Sheet 1.
H. & J. JONES.
AUTOMATIC MAST GATE FOR RAILROAD CROSSINGS.
No. 600,873. Patented Mar. 22, 1898.
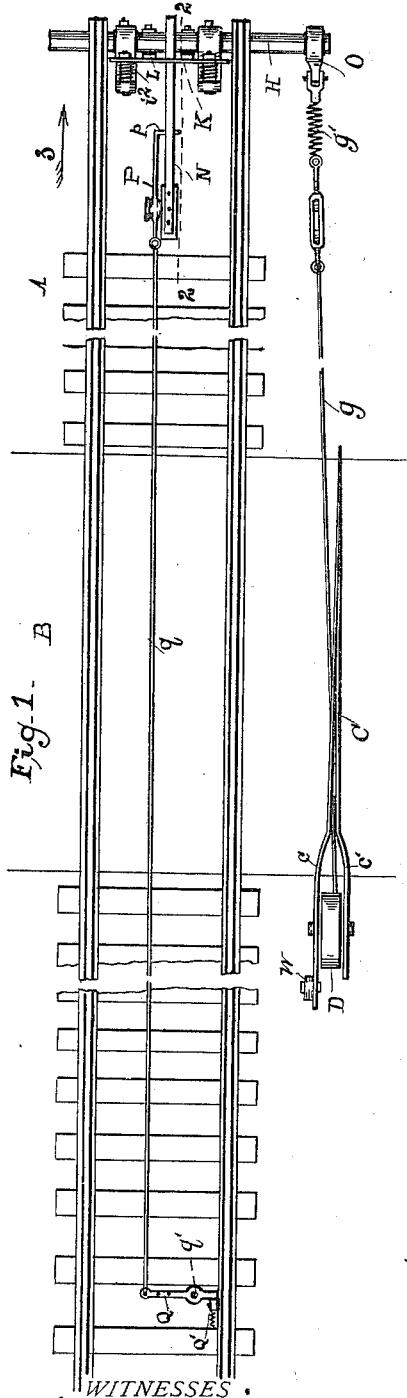
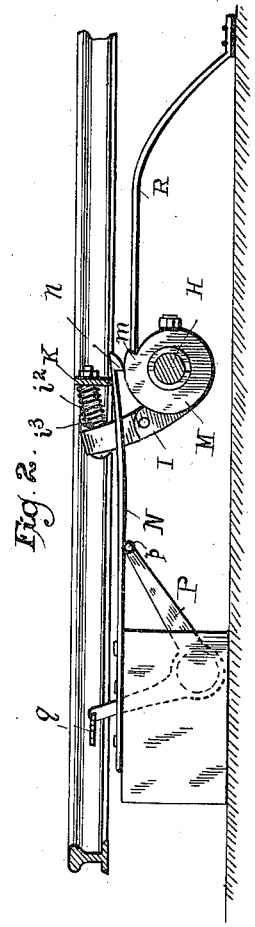
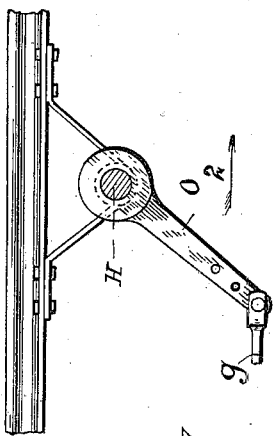
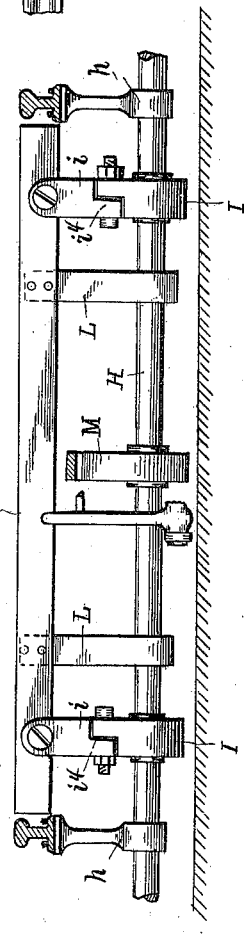
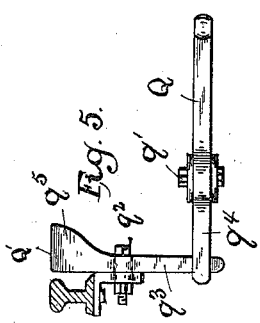
WITNESSES
Chas. K. Davies.
INVENTORS
Henry Jones and Joseph Jones
by their Attorney.

(No Model.) 2 Sheets—Sheet 2.
H. & J. JONES.
AUTOMATIC MAST GATE FOR RAILROAD CROSSINGS.
No. 600,873. Patented Mar. 22, 1898.

WITNESSES
Chas. K. Davies.

INVENTORS
Henry Jones & Joseph Jones,
by
Their Attorney.

UNITED STATES PATENT OFFICE.

HENRY JONES AND JOSEPH JONES, OF KNOXVILLE, TENNESSEE.

AUTOMATIC MAST-GATE FOR RAILROAD-CROSSINGS.

SPECIFICATION forming part of Letters Patent No. 600,873, dated March 22, 1898.

Application filed November 17, 1897. Serial No. 658,835. (No model.)

*To all whom it may concern:*

Be it known that we, HENRY JONES and JOSEPH JONES, citizens of the United States, residing at Knoxville, in the county of Knox and State of Tennessee, have invented certain new and useful Improvements in Automatic Mast-Gates; and we do hereby declare the following to be a full, clear, and exact description of the invention, such as will enable others skilled in the art to which it appertains to make and use the same.

Our invention relates to automatic mast-gates for railroad-crossings, and has for its object the production of a cheap, reliable, and strong gate which shall be automatically operated by an approaching locomotive to depress the gate before the train reaches the crossing, securely retained in its depressed position during the passing of the train, and then automatically raised.

With these objects in view the invention consists in a mast-gate having a power device connected thereto which normally holds the gate in its elevated position, means operated by the approaching locomotive for overcoming said power device and allowing the gate to descend, restraining devices for holding the power device in check while the train is passing, and trip mechanism operated from a point beyond the crossing by the locomotive after the train has passed the crossing for releasing said restraining devices and permitting the power devices to automatically raise the gate.

We have illustrated the preferred form of the invention in the accompanying drawings, forming a part of this specification, in which—

Figure 8:
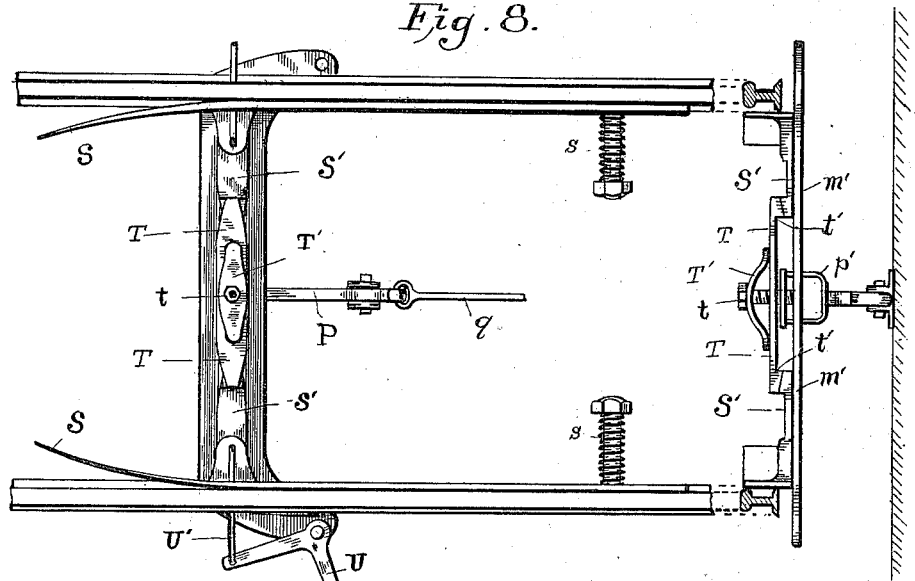
Figure 6:
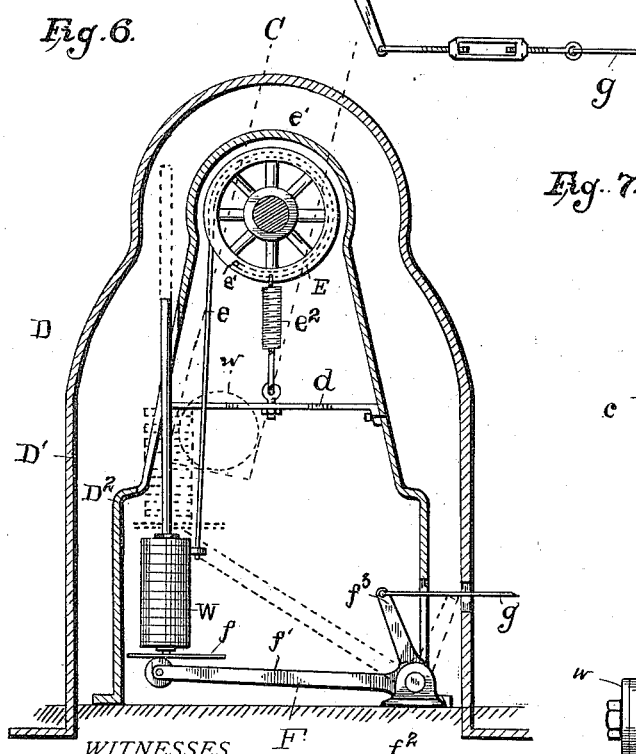
Figure 7:
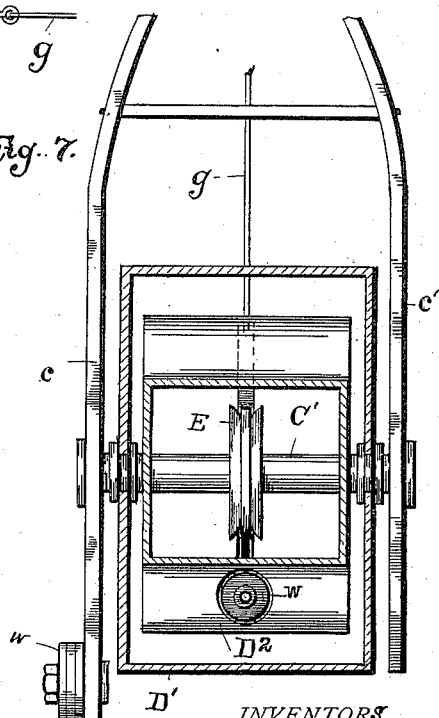

Figure 1 shows a broken plan view of our invention, the gate being shown in lowered position. Fig. 2 is an enlarged sectional view taken on the line 2 2, Fig. 1, but with the parts in the position which they assume when the gate is elevated. Fig. 3 is an end elevation of weight-lifting mechanism attached to the track, looking in the direction of the arrow 3 of Fig. 1. Fig. 4 is a detail of the operating-shaft and its arm. Fig. 5 is a rear elevation of a part of the trip mechanism. Fig. 6 is a vertical transverse section of the tower or support for the gate with its inclosed mechanism in side elevation. Fig. 7 is a sectional plan view of the tower with the gate in its lowered position, and Fig. 8 is a plan view and end elevation of a modification.

Like letters refer to like parts throughout the specification.

In the drawings we have shown but one gate in position and the device as applied to a single track; but it is to be understood that the invention is equally applicable for the operation of two or more gates and that the same may be applied to as many tracks as may traverse the given crossing which it is desired to protect.

Referring now to Fig. 1, A represents a railroad-track which traverses a roadway B, and C a mast-gate closing said roadway when in lowered position. This gate C is mounted on a horizontal shaft $C'$ and turns therewith in a vertical plane, the shaft being journaled in the tower or stand D, Figs. 6 and 7, the gate being preferably bifurcated or forked at its lower end, as clearly shown in Figs. 1 and 7, the respective legs $c$ $c'$ being attached to the shaft $C'$ on the opposite sides of the tower D. Connected to one or both of these legs $c$ $c'$, and on the opposite side of the shaft $C'$ from the gate C, are counterbalancing-weights $w$, the aggregate of these weights being less than that of the gate C on the opposite side of the shaft $C'$, so that if the gate were raised, but were slightly out of the perpendicular, its tendency would be to fall into the position shown in Fig. 1.

We have shown the tower or stand D as composed of an outer protecting-casing $D'$ and an inner casing $D^2$, (see Figs. 6 and 7,) though it may, if deemed desirable, be composed of a single casing. The shaft $C'$ is journaled horizontally in the tower D, preferably with bearings in both of the casings $D'$ and $D^2$. Rigidly keyed to the shaft $C'$ and within the casing $D^2$ is the grooved pulley E, to which one end of the cable $e$ is attached at $e'$, the other end being connected to a weight W, which weight is sufficient to overbalance the weight of the gate C. Connected at one end to the lower part of the pulley-rim and at the other end to the crossbar $d$ is a check-spring $e^2$.

The operation of the device as thus far described is as follows: The weight of the gate C being sufficient to overbalance the weight $w$ and the check-spring $e^2$, and the gate being so placed on the shaft C' as to be slightly out of perpendicular when elevated, (see dotted lines, Fig. 6,) it would fall into horizontal position of its own weight but for the overbalancing-weight W, which acts through the cable $e$ and the pulley E to hold the gate elevated. If then the weight W were raised by any means into the position shown in dotted lines, Fig. 6, the gate C would fall into horizontal position, turning the pulley E on its axis and partially winding the cable $e$ thereon, the check-spring $e^2$ acting to prevent shock. If now the weight W be allowed to descend to the full-line position, it would pull on the cable $e$, and since the combined weights W $w$ overbalance the gate C the pulley would be revolved and the gate raised.

We will now describe the means which we employ to raise the weight W in order that the gate may descend. This weight rests upon a plate $f$, which is supported on the end of the longer arm $f'$ of a bell-crank lever F, which is pivoted at $f^2$ to the tower. A suitable antifriction-roller is carried on the end of the arm $f'$, and to the shorter arm $f^3$ of the bell-crank lever is attached a cable $g$, extending from the tower D to a point some distance up the track in the direction of the approaching train.

At a point distant from the crossing we mount a shaft H, transverse to the track, to turn in bearings $h$ $h$, suitably mounted under the track. Keyed to said shaft H, so as to turn therewith, are two brackets I I, upon whose upwardly-projecting arms $i$ are formed pins $i^2$, supporting a transverse bar K, extending across the track between the rails thereof and with its ends in close proximity thereto. This bar K is mounted to move loosely on the pins $i^2$, check-springs $i^3$ being interposed on the pins between the bar K and the bracket-arms $i$. Suitable stay-springs L L are also mounted to press on the side of the bar K opposite the springs $i^3$, as shown. Between the brackets I I we secure to the shaft H the disk M, having the shoulder or ratchet-tooth $m$ cut in its periphery, while the spring-arm N is mounted with its catch-nose $n$ resting on the periphery of the disk M in proximity to the shoulder $m$. The bracket-arms $i$ have knuckle-joints $i^4$, (most clearly shown in Fig. 3,) which joints yield in the direction from left to right of Figs. 1 and 2 without turning the shaft H, but remain rigid when pressed in the direction from right to left of said figures. Attached to the outer end of the shaft H is the crank-arm O, to which the cable $g$ is connected, a check-spring $g'$ being interposed in the cable between the arm O and the arm $f^3$ of the bell-crank lever F at the tower.

The further operation of the device is as follows: Assume a train advancing along the track from right to left of Fig. 1 and the gate to be elevated in the position shown in dotted lines of Fig. 6. The wheels of the locomotive will strike the bar K and force it forward against the bracket-arms $i$, the shock being absorbed by the springs $i^3$, and the brackets will be depressed, thereby revolving the shaft H and the disk M until the catch $n$ engages the shoulder $m$ thereon. This revolution of the shaft H causes the arm O to move in the direction of the arrow 2 of Fig. 4, thereby producing a pull on the cable $g$, which tilts the bell-crank lever F into the position shown in dotted lines of Fig. 6, thus elevating the weight W and permitting the gate to descend into the position shown in Fig. 1. The engagement of the spring-catch $n$ with the shoulder $m$ on the disk M holds the weight W in the elevated position. For the purpose of releasing the catch $n$ and permitting the weight W to fall and thereby raise the gate C we pivot the bell-crank lever P, Figs. 1 and 2, at a point below the spring-arm N, one arm of this bell-crank lever having a pin $p$, which engages the under side of the spring-arm N, and the other arm of the lever having a cable $q$ attached thereto. This cable $q$ extends to a point suitably distant from the roadway B and on the opposite side of the crossing thereof from the shaft H, at which point it is connected to a horizontal lever Q, pivoted at $q'$ to the track. A vertical lever Q' is also pivoted to the track at $q^2$, with its lower arm $q^3$ in front of the arm $q^4$ of the lever Q and its upper arm $q^5$ in position to be depressed by the wheels of the locomotive, whereby the lever Q will be operated to pull the cable $q$ and trip the spring-catch $n$. The weight W, resting on the arm $f'$ of the bell-crank lever F, exerts a constant pull on the cable $g$ and on the arm O of the shaft H, and as soon as the catch $n$ is released from the shoulder $m$ the shaft is returned to the position shown in Fig. 2, when the shoulder $m$ on the disk M is engaged by the stay-spring R. Should a train be moving in the direction from left to right, Fig. 1, the knuckle-joint $i^4$ will yield and allow the bar K to fold down without turning the shaft H, and when the train has passed the bar will be returned to its normal position by the stay-springs L L. If desired, a suitable spring may be placed against the arm $q^3$ of lever Q' for likewise returning it to its normal position when a train passes in the direction from left to right, Fig. 1.

In the modification illustrated in Fig. 8, S S are two bars attached to the inner sides of the rails with inwardly-turned ends to permit the flanges of the wheels to enter between said bars and the rails of the track. Stay-springs $s$ $s$ surround bolts which hold the rear end of the bars in place. Attached to the bars S or integrally formed therewith are the inwardly-projecting catch-arms S', having catch-shoulders $m'$ cut thereon, the top face of these arms being slightly beveled, as shown. Resting upon the catch-arms S' is the bar T, pressed downward by the tension of the spring T', which is held in place and has its tension adjusted by the screw-bolt $t$. The catch-bar T has catch-shoulders $t'$ $t'$ formed in reverse of the shoulders $m'$ $m'$ on the catch-arms S'. Pivoted to the side of the track is the bell-crank lever U, having one arm connected to the cable $g$ and the other arm by a link to the bar S. Only one such lever and cable are shown; but for operating a gate at each side of the track a similar lever and cable would be placed on the opposite side of the track, as will be readily understood. In operation the bars S, being forced inwardly by the flanges of the wheels, would turn the bell-crank lever U and produce a pull on the cable $g$, which would raise the weight W and allow the gate to descend. The shoulders $t'$ would engage the catch-shoulders $m'$, and thus maintain the pull on the cable $g$ till the tripping device Q Q' of Figs. 1 and 5 is operated to produce a pull on the cable $q$, which would turn the bell-crank lever P. This lever P acts through the yoke $p'$ to lift the bar T against the tension of the spring T', thereby freeing the catch-shoulders $m'$ $t'$, releasing the pull on the cable $g$, allowing the weight W to fall and raise the gate.

For the purpose of clearly illustrating our invention we have shown the cables and other parts exposed; but in practice the cables and many of the other parts may be suitably inclosed to protect them from injury.

Having thus described the preferred form of our invention, we wish it distinctly understood that the same may be varied in the mechanical details and arrangements of the parts without departing from the spirit of our invention, and that we have described the preferred form for purposes of illustration only, and do not intend thereby to exclude from the scope of our invention such variation of the mechanical details and arrangements of the parts.

Having described our invention, what we claim is—

1. The combination of an overbalanced mast-gate and a power device normally holding said gate elevated, with a shaft hung in bearings across the track, knuckle-jointed bracket arms or levers connected thereto, devices supported by said bracket-arms in proximity to the rails, power-relieving devices, and connections between said devices and said shaft, whereby the gate is relieved from the action of the power device and permitted to descend, substantially as described.

2. The combination of an overbalanced mast-gate and a power device normally holding the gate elevated, with a shaft hung in bearings across the track and at one side of the crossing, a transverse bar yieldingly supported on said shaft in the path of the wheels, power-relieving devices, and connections between said shaft and power-relieving devices, whereby the gate is relieved from the action of the power device and permitted to descend, substantially as described.

3. The combination of an overbalanced mast-gate and a power device normally holding the gate elevated, with a shaft hung in bearings across the track and at one side of the crossing, a transverse bar yieldingly supported on said shaft in the path of the wheels, power-relieving devices, and connections between said shaft and power-relieving devices, whereby the gate is relieved from the action of the power device and permitted to descend, detent mechanism holding said power device in check, and tripping devices operated by the train after it has passed the crossing to free the power device substantially as described.

4. The combination of a mast-gate for railroad-crossings and power devices for controlling the same, with a shaft hung transverse to the track at a point distant from the crossing, a bar supported in the path of the wheels of a moving train, yielding devices bearing on the opposite sides of said bar, connections between said bar and shaft whereby the movement of the bar in one direction only is communicated to the shaft, and connections between the shaft and power devices, substantially as described.

5. The combination of an overbalanced mast-gate located at a crossing, a power device normally holding the same elevated, power-relieving mechanism operated by a passing train before it reaches the crossing, detent mechanism holding said power device in check, a lever pivoted to the track beyond the crossing, trip mechanism, and connections between said lever and trip mechanism, substantially as described.

6. The combination of a mast-gate for railway-crossings, an overbalancing-weight normally holding the gate elevated, said weight resting on one arm of a lever, with a shaft hung transverse to the track at a point distant from the crossing, a bar yieldingly connected to said shaft whereby a passing train will revolve the same, a crank-arm on said shaft, and connections between the crank-arm and weight-supporting lever, substantially as described.

7. The combination with the mast-gate, the overbalancing-weight, the lever supporting the same, and the cable connected to the lever, of the shaft hung in bearings across the track, the knuckle-jointed bracket arms or levers connected thereto, the bar supported by said bracket-arms with its ends in close proximity to the rails, and the crank-arm on the shaft also connected to said cable, substantially as described.

8. The combination with the mast-gate, the overbalancing-weight, the lever supporting the same and the cable connected to the lever, of the shaft hung in bearings across the track, the knuckle-jointed bracket arms or levers connected thereto, the bar supported by said bracket-arms with its ends in close proximity to the rails, the crank-arm on the shaft also connected to the cable, the shouldered disk on said shaft, the spring-catch coöperating therewith, and means operated by the train for releasing said catch, substantially as described.

In testimony whereof we affix our signatures in presence of two witnesses.

HENRY JONES.
JOSEPH JONES.

Witnesses:
 JOHN D. CALDWELL,
 JAS. H. WELCKER.